United States Patent [19]

Morishita

[11] Patent Number: 4,658,291

[45] Date of Patent: Apr. 14, 1987

[54] STEREOSCOPIC TELEVISION SIGNAL PROCESSING METHOD, SIGNAL TRANSMITTING UNIT, AND SIGNAL RECEIVING UNIT

[75] Inventor: Masanobu Morishita, Tokyo, Japan

[73] Assignee: NEC Home Electronics Ltd., Osaka, Japan

[21] Appl. No.: 743,848

[22] Filed: Jun. 12, 1985

[30] Foreign Application Priority Data

Jun. 12, 1984 [JP] Japan .................. 59-120436

[51] Int. Cl.⁴ .................................. H04N 13/00
[52] U.S. Cl. ................................ 358/92; 358/3; 358/88
[58] Field of Search ............... 358/3, 88, 89, 91, 92, 358/140, 141, 57

[56] References Cited

U.S. PATENT DOCUMENTS

| 4,164,748 | 8/1979 | Nagata ..................... 358/3 |
| 4,214,257 | 7/1980 | Yamauchi ................. 358/3 |

FOREIGN PATENT DOCUMENTS

| 3234557 | 3/1984 | Fed. Rep. of Germany ......... 358/3 |
| 0027545 | 2/1982 | Japan ............................... 358/3 |

*Primary Examiner*—Howard W. Britton
*Assistant Examiner*—Victor R. Kostak

*Attorney, Agent, or Firm*—Gerald J. Ferguson, Jr.; Michael P. Hoffman; Ronni S. Malamud

[57] ABSTRACT

A stereoscopic television signal processing method including a transmitting unit and a receiving unit where the method includes the steps of generating right and left eye picture signals respectively from a pair of image pick up devices disposed at the right and left sides of an object, each picture signal including four fields constituting a first odd-numbered field, a first even-numbered field, a second odd-numbered field, and a second even-numbered field occurring in the foregoing order where each field includes a plurality of horizontal scanning lines; sampling the right and left eye picture signals at predetermined time intervals so that the samples of the right and left eye picture signals are alternated on the horizontal lines of the four fields of each picture in such a manner that the sampling order is reversed (a) between successive horizontal scanning lines for each field, (b) between the first and second odd-numbered fields and (c) between the first and second even-numbered fields; transmitting the samples to a receiving location; separating from the samples, at the receiving location, the four fields of each picture signal in the order they were generated to thus extract said right and left eye picture signals; and applying the extracted right and left eye picture signals respectively to image receiving devices disposed at the right and left sides of an observer.

11 Claims, 9 Drawing Figures

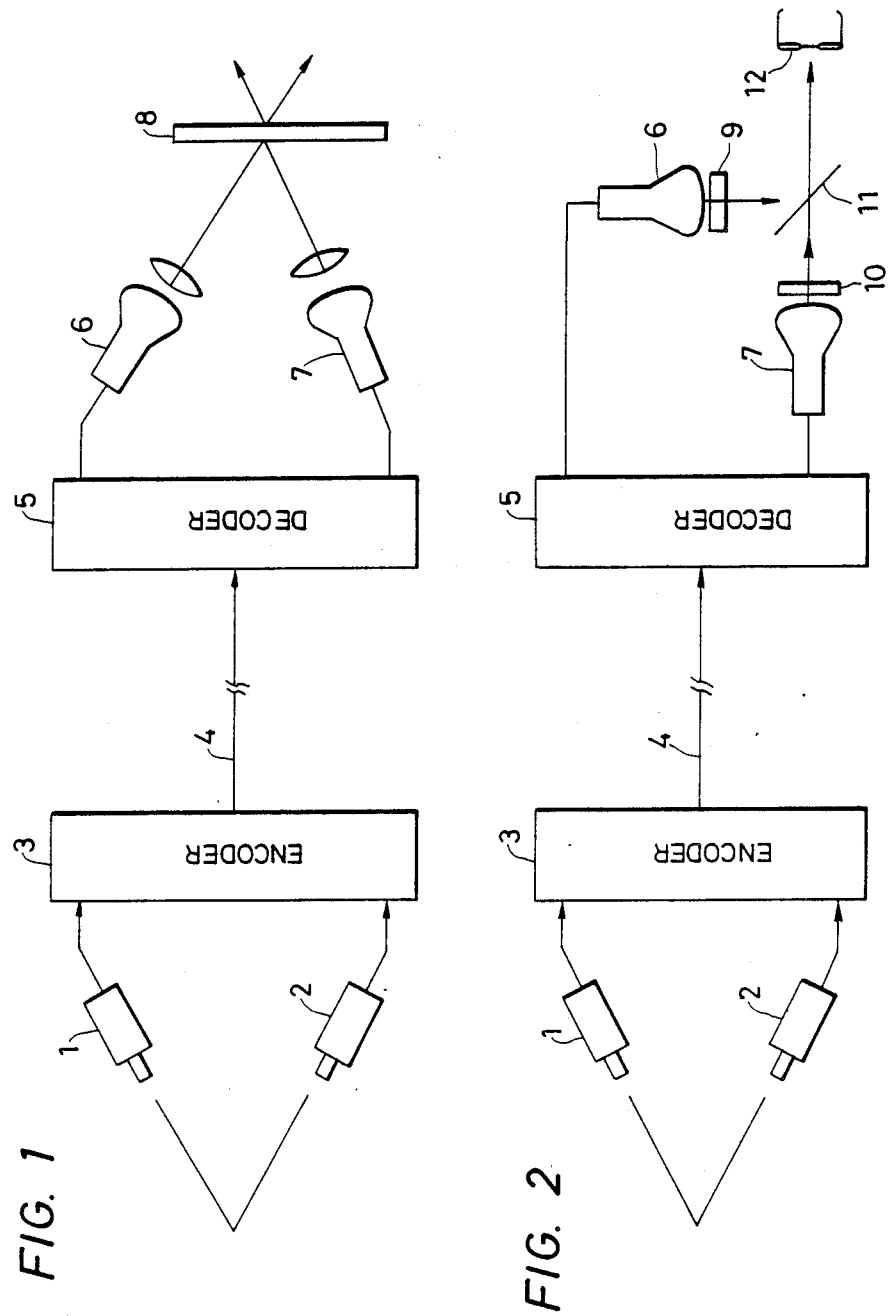

STEREOSCOPIC TELEVISION SIGNAL PROCESSING METHOD, SIGNAL TRANSMITTING UNIT, AND SIGNAL RECEIVING UNIT

BACKGROUND OF THE INVENTION

This invention relates to a sterioscopic television signal processing method, a signal transmitting unit and a signal receiving unit for implementing the method.

In one stereoscopic television system, a pair of television cameras are arranged on both sides of an object to form the right and left video signals thereof. The right and left video signals thus formed are transmitted, and, at the signal receiving side, the right and left video signals are applied to a pair of projection picture tubes which are arranged on both sides of an observer. However, since the video signals formed by the two television cameras must be transmitted as described above, the transmission band is twice that of a non-stereoscopic system and thus not applicable to existing transmission paths.

In order to overcome this difficulty, there have been proposed a variety of band compression systems. For instance, for black-and-white television, a system has been proposed in which the luminance signal of one of the right and left pictures and the difference between the luminance signals of the right and left pictures, after being subjected to band limitation, are transmitted. For color television, a system has been proposed in which R and B signals are selected for one of the right and left pictures while a G signal is selected for one of the right and left pictures while a G signal is selected for the other picture, and the signals thus selected are transmitted after being processed with a color encoder.

However, these conventional band compression systems are disadvantageous in that the transmitted video signals are low in fidelity, and therefore the reproduced picture is low in quality.

Especially, in all conventional band compression systems which allow a person to see sterioscopic television pictures without using special glasses, the transmitted video signals are low in fidelity. Accordingly, the conventional band compression systems are not applicable to a system which has been invented by the present applicant in which an improved stereoscopic image display screen permits a person to observe stereoscopic images without using special glasses, this improved screen being described in Japanese Application No. 122717/1982 in the name of the present inventor, which is hereby incorporated by reference.

SUMMARY OF THE INVENTION

Accordingly, an object of this invention is to overcome the above-described difficulties associated with conventional band compression systems for stereoscopic television systems.

The foregoing object and other objects as well as the characteristic features of the invention will become more apparent from the following detailed description and the appended claims when read in conjunction with the accompanying drawings.

BRIEF DESCRIPTION OF THE DRAWINGS

In the accompanying drawings:

FIG. 1 is a block diagram showing a first embodiment of this invention;

FIG. 2 is a block diagram showing a second embodiment of the invention;

DETAILED DESCRIPTION OF THE INVENTION

Figure 3:
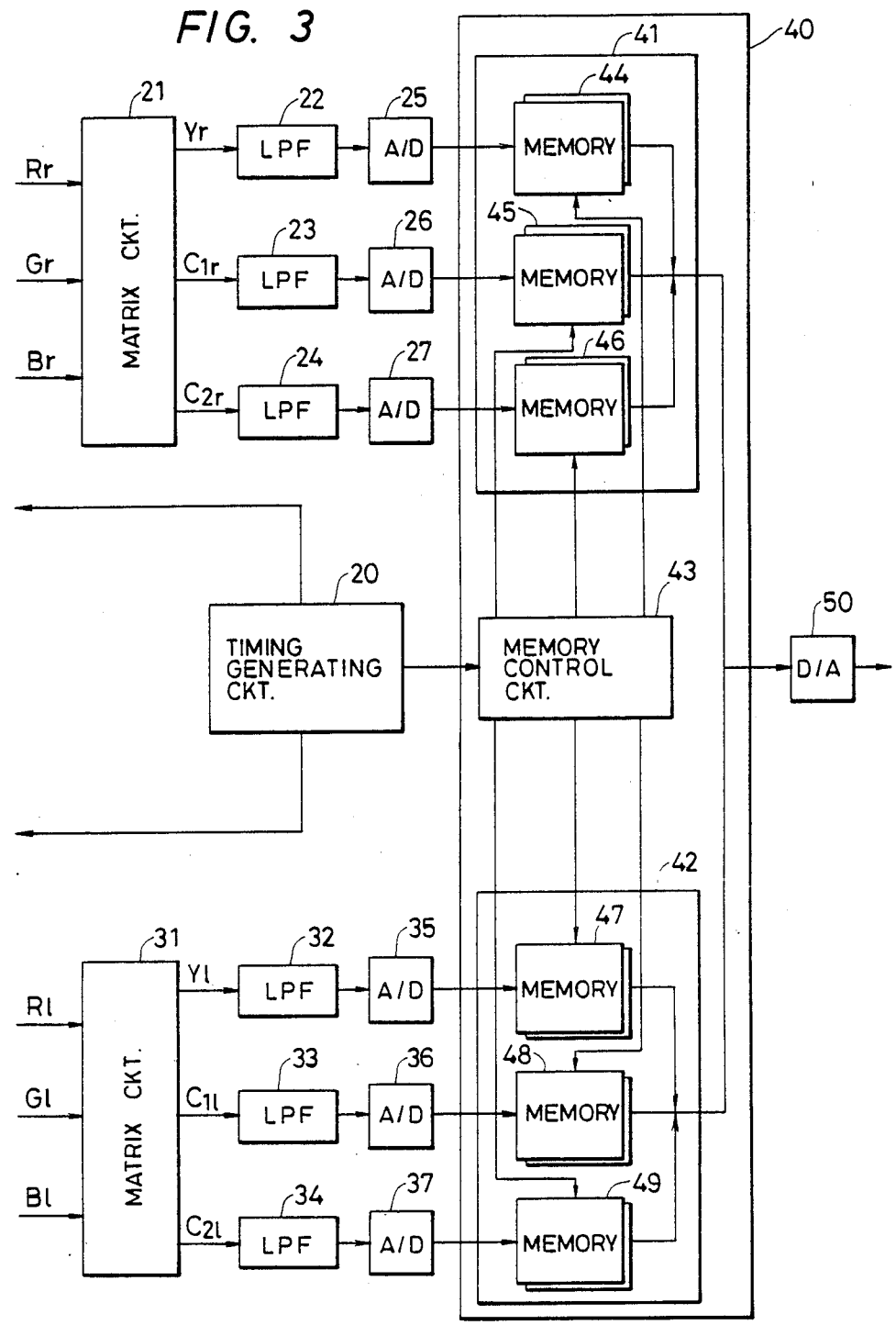
FIG. 3 is a block diagram showing an illustrative encoder shown in FIGS. 1 and 2.

This invention will be described with reference to its preferred embodiments.

A first embodiment of the invention is as shown in FIG. 1. In FIG. 1, reference numeral 1 designates a television camera for the right eye (hereinafter referred to as "right eye television camera 1", when applicable); 2, a television camera for the left eye (hereinafter referred to as "left eye television camera 2", when applicable); 3, an encoder; 4, a transmission path; 5, a decoder; 6, a projection picture tube for the right eye (hereinafter referred to as "right eye projection picture tube 6", when applicable); 7, a projection picture tube for the left eye (hereinafter referred to as "a left eye projection picture tube 7", when applicable); and 8, a stereoscopic image displaying screen.

The right eye television camera set on the right side of an object forms a succession of right eye video signals where each signal comprises a first odd-number field, a first even-number field, a second odd-number field and a second even-number field in the foregoing order and applies the signals to encoder 3. At the same time, the left eye television camera 2 set on the left side of the object forms a succession of left eye video signals where each signal comprises a first odd-number field, a first even-number field, a second odd-number field and a second even-number field in the foregoing order, and applies the signals to encoder 3.

Figure 4:
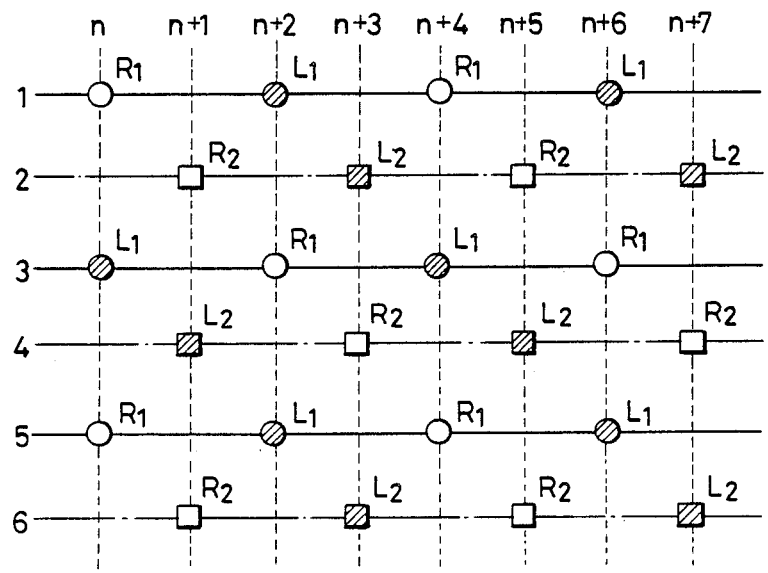
FIGS. 4 and 5 are explanatory diagrams illustrating sampling by the encoder.
Figure 5:
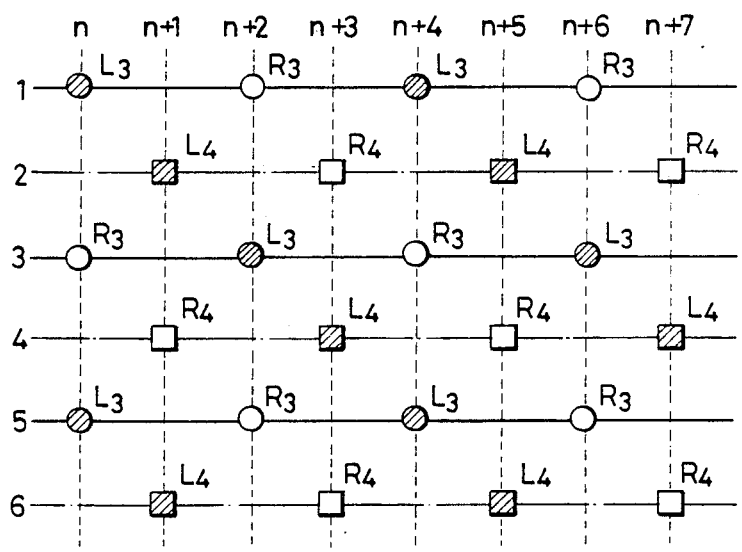

The encoder 3 transmits the four fields from each of the cameras 1 and 2 by sampling them at predetermined spatial sampling points. For example, as illustrated in FIGS. 4 and 5, the spatial sampling points of the right eye and left eye video signals are respectively alternated on the horizontal scanning lines for the four fields where the sampling order is reversed (a) between successive horizontal scanning lines for each field, (b) between the first and second odd-numbered fields and (c) between the first and second even-numbered fields. This will be described in further detail below.

The decoder 5 receives the foregoing transmitted signal from transmission path 4. In the decoder, the right eye video signal and the left eye video signal are separated from the transmitted signal to extract a picture for the right eye (hereinafter referred to as "a right eye picture" when applicable) and a picture for left eye (hereinafter referred to as "a left eye picture", when applicable), and the pictures thus extracted are supplied to the right eye projection picture tube 6 and the left eye projection tube 7, respectively. The two projection picture tubes 6 and 7 projection an image for the right eye (hereinafter referred to as "a right eye image", when applicable) and an image for the left eye (hereinafter referred to as "a left eye image", when applicable), so that a person in front of the stereoscopic image displaying screen observes the stereoscopic image thereon.

A special stereoscopic image displaying screen 8 has been proposed by the inventor to allow a person to observe stereoscopic images without using special glasses. This screen comprises: a transmission type diffusion surface onto which the right eye image and the left eye image displayed respectively on the projection picture tubes 6 and 7 are projected; a light-shielding plate arranged immediately before the transmission type diffusion surface so that the right eye image and the left eye image are projected like vertical stripes on the transmission type diffusion surface; and a lenticular lens arranged behind the transmission type diffusion surface so that a plurality of images in the form of vertical stripes projected on the transmission type diffusion surface are observed as the right eye image and the left eye image. This stereoscopic image displaying screen is described in detail in the specification of the aforesaid Japanese Patent Application No. 122717/1982, which is hereby incorporated by reference.

FIG. 2 illustrates a second embodiment of this invention. In FIG. 2, television cameras 1 and 2, encoder 3, transmission path 4 and decoder 5 are exactly the same as in FIG. 1. In the second embodiment, a right eye projection picture tube 6 and a left eye projection picture tube 7 are orthogonally oriented, and polarizing plates 9 and 10 which are 90° with respect to each other in polarization are disposed in front of the projection picture tubes 6 and 7, respectively. The right eye image and the left eye image respectively transmitted through the polarizing plates 9 and 10 are combined at a half-mirror 11 so as to be observed as a stereoscopic image through a pair of special glasses 12 having the corresponding polarizing plates in the right and left eyepieces.

FIG. 3 is a block diagram of an illustrative embodiment of encoder 3 in FIGS. 1 and 2.

In FIG. 3, three primary color signals Rr, Gr and Br are applied to a matrix circuit 21 by the right eye television camera which scans in synchronization with a timing signal provided by a timing signal generating circuit 20. The primary color signals comprise signals of the aforesaid first odd-number, first even-number, second odd-number and second even-number fields where the four fields form one right eye video signal picture. In the matrix circuit 21, the three primary color signals are utilized to form a luminance signal $Y_r$, and first and second color difference signals $C1_r$ and $C2_r$ in a conventional manner. The luminance signal $Y_r$, and the first and second color difference signals $C1_r$ and $C2_r$ are transmitted through low-pass filters 22, 23 and 24 to A/D (analog-to-digital) conversion circuits 25, 26 and 27, respectively, where they are converted into digital signals. The digital signals are applied to a buffer memory 41 for the right eye disposed in a sampling time axis conversion circuit 40.

In parallel with the above-described operation, three primary color signals $R_l$, $G_l$, and $B_l$ are applied to a matrix circuit 31 by the left eye television camera which scans synchronization with the timing signal provided by the timing signal generating circuit 20. In the matrix circuit 31, these color signals are utilized to form a luminance signal $Y_l$, and first and second color difference signals $C1_l$ and $C2_l$. The luminance signal and the first and second color difference signals comprise the aforesaid first odd-number, first even-number, second odd-number and the second even-number fields where the four fields form one left eye video signal picture. The luminance signal and the color difference signals are applied through low-pass filter circuits 32, 33 and 34 to A/D conversion circuits 35, 36 and 37, respectively, where they are converted into digital signals. These digital signals are supplied to a buffer memory 42 for the left eye disposed in the sampling time axis conversion circuit 40.

The buffer memory 41 for the right eye (hereinafter referred to as "right eye buffer memory 41", when applicable) has a buffer memory 44 for storing the luminance signal $Y_r$, a buffer memory 45 for storing the first color difference signal $C1_r$, and a buffer memory 46 for storing the second color difference signal $C2_r$. The buffer memory 42 for the left eye (hereinafter referred to as the "left eye buffer memory 42", when applicable) has a buffer memory 47 for storing the luminance signal $Y_l$, a buffer memory 48 for storing the first color difference signal $C1_l$ and a buffer memory 49 for storing the second color difference signal $C2_l$. These buffer memories 44 through 49 employ a suitable system such as a time division multiplexing system or multiple bank system so that reading and writing can be independently executed.

The writing and reading of the buffer memories 44 through 49 are controlled by a memory control circuit 43 which operates in synchronization with the timing signal produced by timing signal generating circuit 20. The memory control circuit 43 writes the signals into the buffer memories 44 through 49 by sampling them at predetermined spatial sampling points so that the spatial sampling points of the right eye video signal and the left eye video signal are respectively alternated on the horizontal scanning lines for the four fields where the sampling order is reversed (a) between successive horizontal scanning lines for each field, (b) between the first and second odd-number fields and (c) between the first and second even-number fields. This will now be described with reference to FIGS. 4 and 5 in more detail.

FIG. 4 shows sampling points in the first odd-number field which is first sampled and written or stored, and sampling points in the first even-number field which is next sampled and stored.

Considering the first odd-number field only and, in particular, the first horizontal scanning line, the right eye video signal R1 is sampled at horizontal field times n and n+4 while the left eye video signal L1 is sampled at horizontal field times n+2 and n+6. Thus, in effect, a composite signal is derived where the first horizontal line of the first odd number field has four predetermined sampling times. The horizontal lines may be divided into eight sampling intervals where a single interval corresponds to a basic spatial sampling period, each of which is defined by two adjacent, vertical, dotted lines. Thus, the right eye and left eye video signals each have sampling periods which may be four times the basic spatial sampling period. As can be seen, the right eye and left eye video signals R1 and L1 are alternately sampled on the first horizontal scanning line of the composite signal of FIG. 4. Similarly as in the case of the first horizontal scanning line, on the third horizontal scanning line, the right eye video signal R1 and the left eye video signal L1 are sampled in alternation at four predetermined sampling times. However, the order of sampling of the right eye video signal R1 and the left eye video signal L1 is reversed between the first and third horizontal scanning lines. Similarly, the order of sampling of the right eye video signal R1 and the left eye video signal L1 is reversed between the third and fifth horizontal scanning lines. Accordingly, the arrangement of the sampling points on the first horizontal scanning line is exactly the same as that of the sampling points on the fifth horizontal scanning line. That is, in the group of the first, third, fifth, . . . horizontal scanning lines forming the first odd-numbered field, the sampling positions of the right eye video signal R1 and the order of sampling of the left eye video signal L1 is reversed between adjacent horizontal scanning lines.

In the first even-number field which is sampled and stored after the first odd-number field, sampling is performed in the same manner as that in the first odd-number field. In other words, in each horizontal scanning line, the right eye video signal R2 and the left eye video signal L2 are sample alternately and each at four predetermined sampling times of the composite signal, and the order of sampling of the right eye video signal and the sampling positions of the left eye video signal is reversed between adjacent horizontal scanning lines.

In the second odd-number field which is thirdly sampled and stored, as shown in FIG. 5, sampling is carried out in the same manner as that in the first odd-number field or the first even-number field. In other words, in each horizontal scanning line, the right eye video signal R3 and the left eye video signal L3 are sampled alternately and each at four predetermined sampling times, and the order of the sampling times of the right eye video signal and the sampling times of the left eye video signal are reversed between adjacent horizontal scanning lines.

In the second even-number field which is fourthly sampled, sampling is performed in the same manner.

As is apparent from a comparison of FIGS. 4 and 5, the order of sampling is reversed between the two odd-number fields and between the two even-number fields. Thus, for example, the sampling times of the first horizontal line of the first even field of the composite signal occur in the following order: R2, L2, R2, L2 while in the first horizontal line of the second even field of the composite signal, the order of sampling times is reversed to be L4, R4, L4, R4. The stored composite signal thus comprises two frames, these frames being respectively illustrated in FIGS. 4 and 5 and stored in buffer memories 44 through 49.

The memory control circuit 43 controls the operation of reading data out of buffer memories 44 through 49 as well as the operation of sampling and writing data into these buffer memories. That is, once the samples of FIGS. 4 and 5 are stored in memories 44 through 49, the sampling values of the first odd-number field as shown in FIG. 4 are read in the order of the horizontal scanning lines, and then the sampling values of the first even-number field of FIG. 4 are read. Next, in succession, the sampling values of the second odd-number field of FIG. 5, and then the sampling values of the second even-number field are read. Thus, in reading out the sample values of these four fields, the odd number lines as shown in FIG. 4 are first read, followed by the even lines of FIG. 4 and then followed by the odd lines of FIG. 5 and the even lines of FIG. 5. As these samples are being read, they are replaced by the samples of next composite signal. Thus, for example, as the frame of FIG. 5 is being read and transmitted, the FIG. 4 frame of the next composite signal is being written into memory locations occupied by the FIG. 4 frame of the previous composite signal.

In the reading operations of the buffer memories 44 through 49 in which the luminance signals Y, the first color difference signals C1 and the second color difference signals C2 for the right eye and the left eye have been written, first written sampling values are first read out. However, between the buffer memories 44 through 49, the order of reading and the order of writing are not in correspondence to each other, and the writing speed and the reading speed are different. That is, the luminance signals Y, the first color difference signal C1 and the second color difference signals C2 are preferably subjected to time axis conversion.

Figure 6:
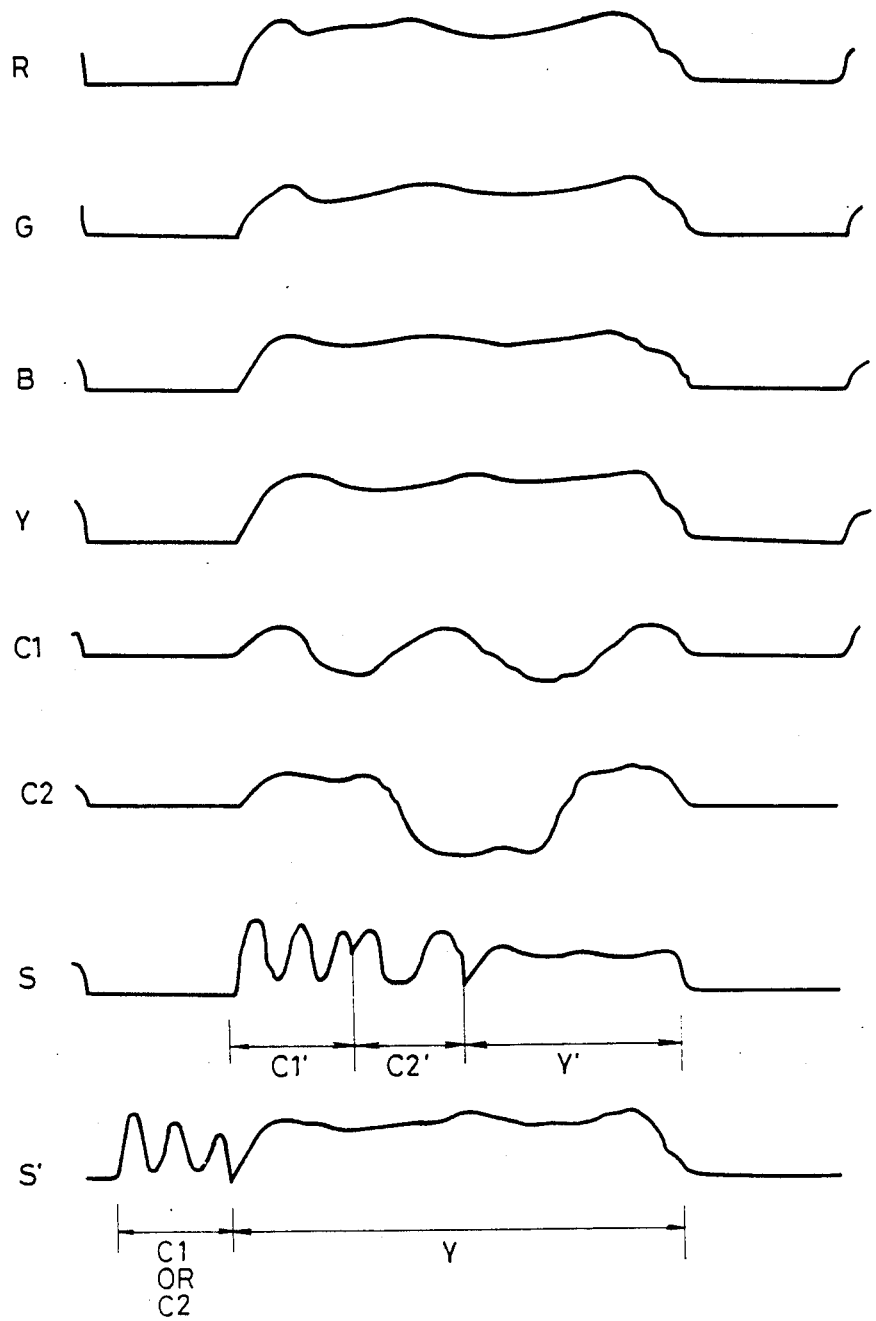
FIG. 6 is a waveform diagram describing time axis conversion method employed in the encoder.

FIG. 6 is a waveform diagram for a description of the time axis conversion method. In FIG. 6, the reference characters have no suffix letters which distinguish waveforms for the right eye from those for the left eye since the time axis conversion method is applied to both the right eye video signal and left eye video signal in the same manner. The R, G and B signals supplied to the matrix circuits 21 and 31 are converted into the luminance signal Y, the first color difference signal C1 and the second color difference signal C2, which, in turn, are converted into digital signals. The digital signals are sampled and written into the buffer memories 44 through 49 in the above-described manner. The signals Y, C1 and C2 thus written are read out of the buffer memories while being subjected to time axis conversion, so as to form waveforms S in FIG. 6.

First, the first color difference signals $C1_r$ and $C1_l$ are alternately read out of the buffer memories 45 and 48 at a speed which is four times the writing speed. Thus, in particular, referring to FIG. 4, the first $C1_r$ and $C1_l$ signals are obtained from the first $R_l$ and $L_l$ signals in the first horizontal line of the first odd field. The processing of successive signals is effected in a similar manner. The second color difference signals $C2_r$ and $C2_l$ are alternately read out of the buffer memories 46 and 49 at a speed four times as fast as the writing speed. Thereafter, the luminance signals $Y_r$ and $Y_l$ are alternately read out of the buffer 44 and 47 at a speed twice as fast as the writing speed. Thus, the time axes of the luminance signals $Y_r$ and $Y_l$ are compressed by one-half ($\frac{1}{2}$) and the time axes of the first and second color difference signals C1 and C2 are each compressed to a quarter ($\frac{1}{4}$), so that the R, G and B signals for each eye are compressed each horizontal scanning period. In particular, the signals S thus comprise a first portion C1' (see FIG. 6) which includes in succession C1 and $C1_l$, a second portion C2' which includes a succession $C2_r$ and $C2_l$, and a third portion Y' which includes in succession $Y_r$ and $Y_l$. The signals S are converted into analog signals by a D/A circuit 50 (FIG. 3). The analog signals are delivered to the transmission path as they are, or after being suitably modulated or power-amplified according to the distance of transmission.

In summary, the waveforms S (or S') in FIG. 6 can be formed in accordance with the drivings of memory blocks 41 and 42. Memory block 41 is for storing the right eye signal, memory 44 is for storing the luminance signal Yr, the memory 45 for storing color difference signal C1r, and the memory 46 for storing the color difference signal C2r. The timing in storing the memories is designated by R in FIGS. 4 and 5. The numerals 1 through 4 annexed to R indicate timings of the first through fourth consecutive fields, respectively. Likewise, the left eye signal is stored in the memories 47, 48 and 49 at a timing indicated by L in FIGS. 4 and 5.

Writing into the memories 44 through 49 are effected at timings shown in FIGS. 4 and 5.

With respect to waveform S, reading of the luminance signal is substantially the same in both cases of FIGS. 4 and 5. However, the frequency of the readout clocks in increased to two times greater than the frequency at the time of writing. A signal is obtained from the D/A converter 50 such as the waveform Y' shown in FIG. 6. The color difference signals C1 are read out from the memories 45 and 48 (see C1' in FIG. 6), in the case of which the readout clock has a frequency of four times greater than the frequency at the time of writing. This thus makes the timing of C1' different from the timings of Y'; the luminance signal. Therefore, the reading is effected by thinning out one out of the two, resulting that the readout clock frequencies of the luminance signal and the color difference signal meet with each other. This is equally true with respect to the color difference signal C2.

Figure 7:
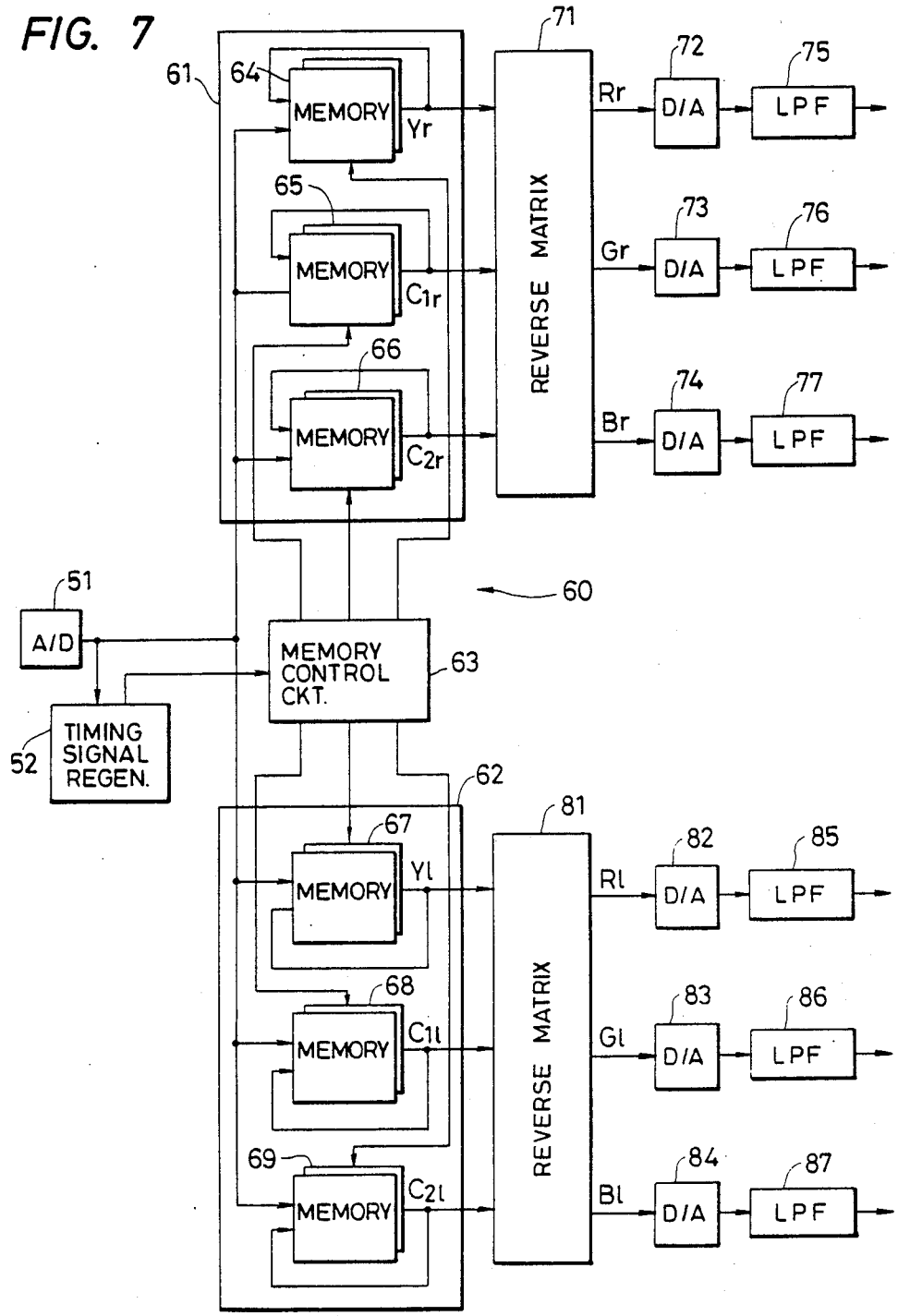
FIG. 7 is a block diagram of an illustrative decoder shown in FIGS. 1 and 2.

As will be discussed in detail below, the receiving side is as shown in FIG. 7, which is inverse to the transmitting side shown in FIG. 3. That is, writing into and reading from the memory blocks 61 and 62 are effected inverse to the writing into and reading from the memory block 41 and 42 shown in FIG. 3.

Assuming that in the case of S shown in FIG. 6, the color signal and the luminance signal are the same band signals, the frequency band of the luminance signal is doubled with respect to that of the color signal. In this system, the respective scanning lines contain two kinds of color signals as shown in FIG. 6.

The frequency band of the color signal is generally set of $\frac{1}{8}$ through $\frac{1}{4}$ of the frequency band of the luminance signal. The resolution of the screen in the vertical direction may be low as far as the color difference signal is concerned. Thus, a method is used such that two kinds of color signals are alternately transmitted. A so-called line sequence method is adopted generally.

FIG. 7 is a block diagram showing one example of the decoder 5 in FIGS. 1 and 2.

Video signals received through the transmission path from the encoder 3 are demodulated or amplified when necessary, and are applied to an A/D conversion circuit 51 where they are converted into digital signals. The digital signals are applied to a right-left separation/time axis reverse-conversion circuit 60 and a timing signal regeneration circuit 52.

The right-left separation/time axis reverse-conversion circuit 60 comprises: a buffer memory 61 for the right eye video signal; a buffer memory 62 for the left eye video signal; and a memory control circuit 62 for controlling the writing and reading operations of these buffer memories 61 and 62.

The buffer memory 61 for the right eye video signal comprises a luminance signal buffer memory 64; a first color difference signal buffer memory 65; and a second color difference signal buffer memory 66. Similarly, the buffer memory 62 for the left eye video signal comprises a luminance signal buffer memory 67; a first color difference signal buffer memory 68; and a second color difference signal buffer memory 69.

Figure 8:
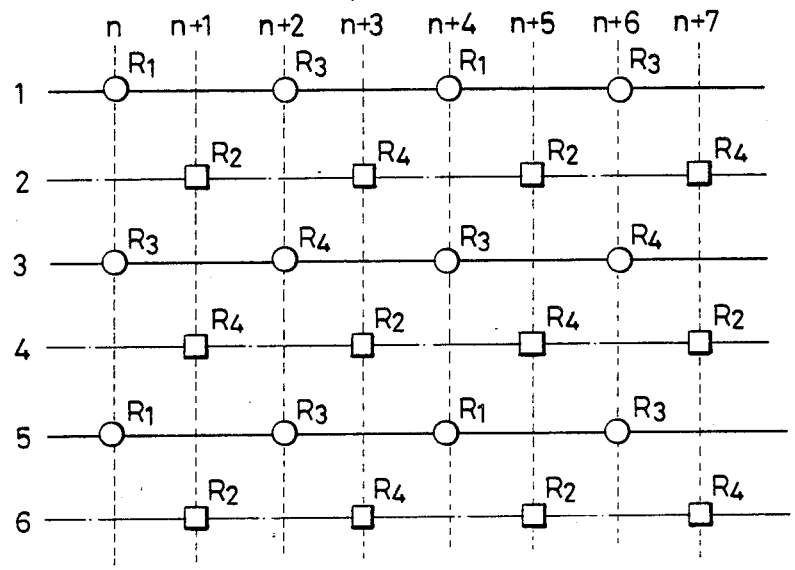
FIGS. 8 and 9 are explanatory diagrams showing the arrangements of the video signals for the right and left eyes which are separated by the decoder.
Figure 9:
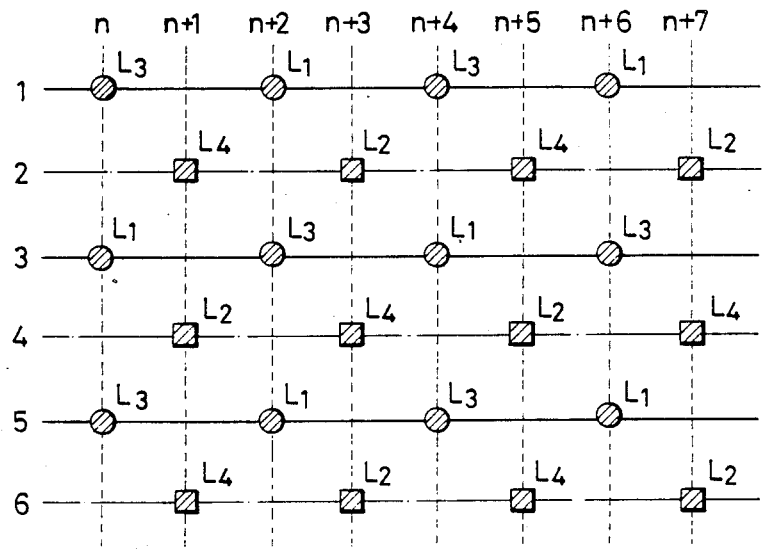

The memory control circuit 63 controls the writing operations of the buffer memories 61 and 62 in response to the timing signal from the timing signal regenerating circuit 52. The writing operations of the buffer memories 61 and 62 are so carried out that the right eye video signals on the horizontal scanning lines in the four fields of the transmitted composite signal are written in the buffer memory 61 while the left eye video signals on the horizontal scanning lines are written in the buffer memory 62. In other words, as shown in FIGS. 8 and 9 the right eye video signals R1 through R4 extracted from the four fields are written in the buffer memory 61, while the left eye video signals L1 through L4 extracted from the four fields are written in the buffer memory 62.

These signals are written in the buffer memories 61 and 62 in the order of reception of them. The reading operations of the buffer memories 61 and 62 which are carried out in parallel with the writing operations are performed as follows: the first color difference signals $C1_r$ and $C1_l$, the second color difference signals $C2_r$ and $C2_l$ and the luminance signals $Y_r$ and $Y_l$ are read out of the buffer memories 61 and 62 simultaneously with predetermined periods which may correspond to the original periods of these respective signals at the time they were first written into buffer memories 41 and 42. As a result, the transmitted video signals having the waveform S in FIG. 6 undergo time axis reverse-conversion when read, so that a first color difference signal C1, a second color difference signal C2 and a luminance signal Y for each eye, as shown in FIG. 6, are obtained.

The luminance signals, and the color difference signals are applied to the reverse matrixes 71 and 81, where they are converted into R, G and B signals for the right eye and those for the left eye, respectively. The R, G and B signals for the right eye are applied respectively through D/A conversion circuits 72, 73 and 74 and low-pass filter circuits 75, 76 and 77 to the right eye projection picture tube. Similarly, the R, G and B signals for the left eye are applied respectively through D/A conversion circuits 82, 83 and 84 and low pass filter circuits 85, 86 and 87 to the left eye projection picture tube.

For simplification in illustration, movement detecting means on the side of the encoder and movement detecting means on the side of the decoder are not shown, However, in order to transmit motion pictures, these means should be suitably added, for instance, according to the arrangement disclosed in FIG. 6 in the paper of Ninomiya, et al. entitled "Movement Correction Multiplex Sampling Transmission System" in the Television Society Technique Report TEBS 95-2 (March 1984), which is incorporated herein by reference.

The encoder 3 may be modified as follows. The A/D conversion circuits 25, 26 and 27, and the A/D conversion circuits 35, 36 and 37 may be provided in front of matrix circuits 21 and 31, respectively, so that the matrix operation and the low pass filter operation are performed in the digital mode.

In the above-described embodiment, the time axis of the luminance signal is compressed by one-half ($\frac{1}{2}$), and the time axes of the first and second color difference signals by one-quarter ($\frac{1}{4}$); however, other compression ratios may be employed. Furthermore, the television systems may be so modified that, as is apparent from a waveform S' in FIG. 6, the luminance signal Y is transmitted as it is, and the first and second color difference signals C1 and C2 are alternately transmitted for every horizontal scanning line where the color difference signals are each compressed by one-quarter ($\frac{1}{4}$). Thus, with respect to S', the frequency band of the color signal is set to approximately $\frac{1}{4}$ with respect to the luminance signal frequency band, and the color signal is transmitted in line sequence where the color difference signals C1 and C2 are switched at successive scanning lines. Writing into and reading from the memory blocks 41 and 42 are substantially same with respect to the case of S shown in FIG. 6 except that the timing and the clock frequency are slightly different.

If, in transmission system, the frequency corresponding to the spatial sampling period indicated by the distance between adjacent dotted lines in FIGS. 4 and FIG. 5 is set to 14.3 mHz (four times the subcarrier frequency) on the time axis, the frequency of sampling the right eye signal is 7.15 mHz as is that for the left eye signal and accordingly the transmission band is 3.58 mHz. Thus, the time axes of the color difference signals is compressed by about ¼.

The stereoscopic television system may also be so modified that, instead of displaying only the video signals occurring at the sampling positions (these being the signals which are recieved at the decoder), the video signals at the positions which are not sampled on the side of the encoder may be displayed by obtaining them by interpolation from the video signals at the surrounding sampling positions.

As is apparent from the above description of the present invention, the right eye video signal and the left eye video signal are each divided into four fields, and the right eye video signal and the left eye video signal are alternately transmitted. On the signal reception side, the right eye signal and the left eye signal are separated from each other, to form the right eye frame and left eye frame each of which consists of four fields as shown in FIGS. 8 and 9. Therefore, in the stereoscopic television system of the present invention, the transmitted and restored video signal is improved in fidelity, and accordingly the resultant picture is high in quality when compared with conventional band compression systems.

In conventional band compression systems, the R and B signals are, for example, used for the right eye while the G signal is used for the left eye, and therefore it is essential to use the special glasses. On the other hand, in the stereoscopic television system of the invention, both the video signal for the right eye and the video signal for the left eye, each having the R, G and B signals, are complete, and accordingly a stereoscopic image displaying screen such as that described hereinbefore may be utilized so as to permit a person to observe stereoscopic images without using such special glasses.

It is to be understood that the above detailed description of the various embodiments of the invention is provided by way of example only. Various details of design and construction may be modified without departing from the true spirit and scope of the invention as set forth in the appended claims.

What is claimed is:

1. A stereoscopic television signal processing method comprising the steps of
    generating right and left eye picture signals respectively from a pair of image pickup means disposed at the right and left sides of an object, each said picture signal including four fields constituting a first odd-numbered field, a first even-numbered field, a second odd-numbered field and a second even-numbered field occurring in the foregoing order where each field includes a plurality of horizontal scanning lines;
    sampling said right and left eye picture signals at predetermined time intervals so that the samples of the right and left eye picture signals are alternated on the horizontal lines of the four fields of each picture in such a manner that the sampling order is reversed (a) between successive horizontal scanning lines for each field, (b) between the first and second odd-numbered fields and (c) between the first and second even-numbered fields;
    transmitting said samples to a receiving location;
    separating from said samples, at said receiving location; the said four fields of each picture signal to thus extract said right and left eye picture signals; and
    applying the extracted right and left eye picture signals respectively to image receiving means disposed at the right and left sides of an observer.

2. A method as in claim 1 where said right and left eye picture signals are color signals each consisting of first and second color difference signals and a luminance signal and where, in said transmitting step, adjacent ones of said samples are so transmitted that the first color difference signals of the adjacent samples are first successively transmitted followed by successive transmission of the second color difference signals of the adjacent samples and then by successive transmission of the luminance signals of the adjacent samples and where said method includes compressing each of the transmitted first and second color difference signals and luminance signals in time by respective predetermined amounts.

3. A method as in claim 2 wherein including the steps of compressing said first and second color difference signals by ¼ in time and said luminance signals by ½ in time.

4. A method as in claim 1 where said right and left eye picture signals are color signals each consisting of first and second color difference signals and a luminance signal and where, in said transmitting step, one of said samples for each of said right and left eye picture signals is so transmitted that (a) one of said color difference signals is first transmitted followed by successive transmission of the luminance signal on the same horizontal line as said one color difference signal and (b) the other of said color difference signals is first transmitted followed by successive transmission of the luminance signal on the next horizontal line such that a luminance signal is transmitted to every horizontal line while the color signals alternate between the first and second color difference signals for successive horizontal lines and where said method includes compressing each of the transmitted first and second color difference signals and luminance signals in time by respective predetermined amounts.

5. A method as in claim 4 including the step of compressing said first and second color different signals by ¼ in time and not compressing said luminance signals.

6. A signal transmission unit for use in a stereoscopic television signal processing system comprising
    a pair of image pickup means for generating right and left eye picture signals respectively, said pair of image pickup means being disposed at the right and left sides of an object, each said picture signal including four fields constituting a first odd-numbered field, a first even-numbered field, a second odd-numbered field and a second even-numbered field occuring in the foregoing order where each field includes a plurality of horizontal scanning lines;
    means for sampling said right and left eye picture signals at predetermined time intervals so that the samples of the right and left eye picture signals are alternated on the horizontal lines of the four fields of each picture in such a manner that the sampling order is reversed (a) between successive horizontal scanning lines for each field, (b) between the first and second odd-numbered fields and (c) between the first and second even-numbered fields; and means for transmitting the samples to a receiving location.

7. A unit as in claim 6 where said right and left eye picture signals are color signals each consisting of first and second color difference signals and a luminance signal and where, in said transmitting means, means are included for so transmitting adjacent ones of said samples that the first color difference signals of the adjacent samples are first successively transmitted followed by successive transmission of the second color difference signals of the adjacent samples and then by successive transmission of the luminance signals of the adjacent samples and where said unit includes means for compressing each of the tranmitted first and second color difference signals and the luminance signals in time by respective predetermined amounts.

8. A unit as in claim 7 where said compressing means compresses said first and second color difference signals by $\frac{1}{4}$ in time and said luminance signals by $\frac{1}{2}$ in time.

9. A unit as in claim 6 where said right and left eye picture signals are color signals each consisting of first and second color difference signals and a luminance signal and where, in said transmitting means, means are included for so transmitting one of said samples for each of said right and left eye picture signals that (a) one of said color difference signals is followed by successive transmission of the luminance signal on the same horizontal line as said one color difference signal and (b) the other of said color difference signals is first transmitted followed by successive transmission of the luminance signal on the next horizontal line such that a luminance signal is transmitted to every horizontal line while the color signals alternate between the first and second color difference signals for successive horizontal lines and where said unit includes means for compressing each of the transmitted first and second color difference signals and luminance signals in time by respective predetermined amounts.

10. A unit as in claim 9 where said first and second color difference signals are compressed by $\frac{1}{4}$ in time and said luminance signals are not compressed.

11. A signal receiving unit in a stereoscopic television signal processing system in which a pair of right and left eye picture signals are respectively generated from a pair of image pickup means disposed at the right and left sides of an object, each said picture signal including four fields constituting a first odd-numbered field, a first even-numbered field, a second odd-numbered field and a second even numbered field occurring in the foregoing order where each field includes a plurality of horizontal scanning lines sampling means sample said right and left eye picture signals at predetermined time intervals so that the samples of the right and left eye picture signals are alternated on the horizontal lines of the four fields of each picture in such a manner that the sampling order is reversed (a) between successive horizontal scanning lines for each field, (b) between the first and second odd-numbered fields and (c) between the first and second even-numbered fields; and transmitting means for transmitting said samples to said receiving unit;

means for separating from said samples the said four fields of each picture signal to thus extract said right and left eye picture signals;s and means for applying the extracted right and left eye picture signals respectively to image receiving means disposed at the right and left sides of an observer.

* * * * *